United States Patent
Sidor et al.

(10) Patent No.: US 6,880,470 B2
(45) Date of Patent: Apr. 19, 2005

(54) WASTE DISPOSAL APPARATUS

(75) Inventors: Richard J. Sidor, Arlington Heights, IL (US); Mark Stenftenagel, Elmhurst, IL (US); Salvatore S. Graziano, Western Springs, IL (US)

(73) Assignee: Eco Tekk International, LLC, Kildeer, IL (US)

( * ) Notice: Subject to any disclaimer, the term of this patent is extended or adjusted under 35 U.S.C. 154(b) by 116 days.

(21) Appl. No.: 10/252,733

(22) Filed: Sep. 23, 2002

(65) Prior Publication Data

US 2003/0230218 A1 Dec. 18, 2003

Related U.S. Application Data

(60) Provisional application No. 60/390,686, filed on Jun. 18, 2002.

(51) Int. Cl.[7] .............................................. A47B 85/00
(52) U.S. Cl. ...................... 108/25; 108/26; 108/50.11
(58) Field of Search ...................... 108/25, 26, 50.11, 108/24; 220/830, 826, 908, 910, 911; 312/229, 228, 232

(56) References Cited

U.S. PATENT DOCUMENTS

| | | | | |
|---|---|---|---|---|
| 830,532 A | * | 9/1906 | Rozee ........................... | 108/11 |
| 907,839 A | * | 12/1908 | Mendenhall ................. | 108/24 |
| 1,897,717 A | * | 2/1933 | Appel .......................... | 108/26 |
| 2,241,309 A | * | 5/1941 | Kovalik ........................ | 38/141 |
| 3,386,444 A | * | 6/1968 | Brenner et al. ............. | 604/357 |
| 4,296,506 A | * | 10/1981 | Stoute et al. .................. | 4/480 |
| 4,487,135 A | * | 12/1984 | Van Ryn ....................... | 108/25 |
| 4,747,352 A | * | 5/1988 | Guidry et al. ................ | 108/26 |
| 5,055,081 A | * | 10/1991 | Nayak .......................... | 446/75 |
| 5,097,750 A | | 3/1992 | Oldham et al. | |
| 5,284,268 A | | 2/1994 | Marsan et al. | |
| 5,421,270 A | * | 6/1995 | Kelly ........................... | 108/25 |
| 5,542,359 A | * | 8/1996 | Polries ......................... | 108/26 |
| 5,572,934 A | * | 11/1996 | Aldridge et al. ............. | 108/25 |
| 6,026,972 A | | 2/2000 | Makowski | |
| 6,135,305 A | | 10/2000 | Brady | |
| 6,152,047 A | * | 11/2000 | Mac Namara ............... | 108/26 |
| 6,321,662 B1 | * | 11/2001 | Fraise .......................... | 108/25 |
| 6,427,822 B1 | | 8/2002 | Johnson | |

FOREIGN PATENT DOCUMENTS

CH              682042 A2  *  7/1993

OTHER PUBLICATIONS

International Search Report, dated Aug. 19, 2003, issued by the U.S. Patent Office, for International Patent Application No. PCT/US03/17866 (3 pages).

* cited by examiner

Primary Examiner—Jose V. Chen
(74) Attorney, Agent, or Firm—Smith, Gambrell & Russell, LLP

(57) ABSTRACT

A waste disposal apparatus with a retractable drop chute for delivering waste to a waste container movably connected beneath a surface covering the entire waste container.

34 Claims, 6 Drawing Sheets

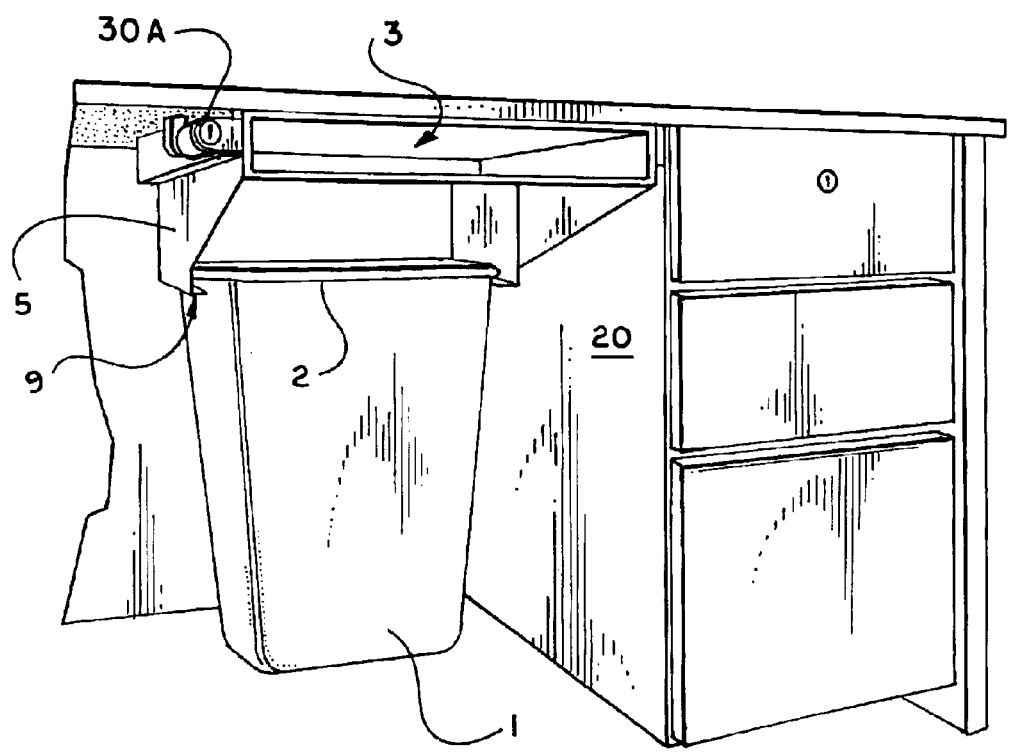
Fig_4
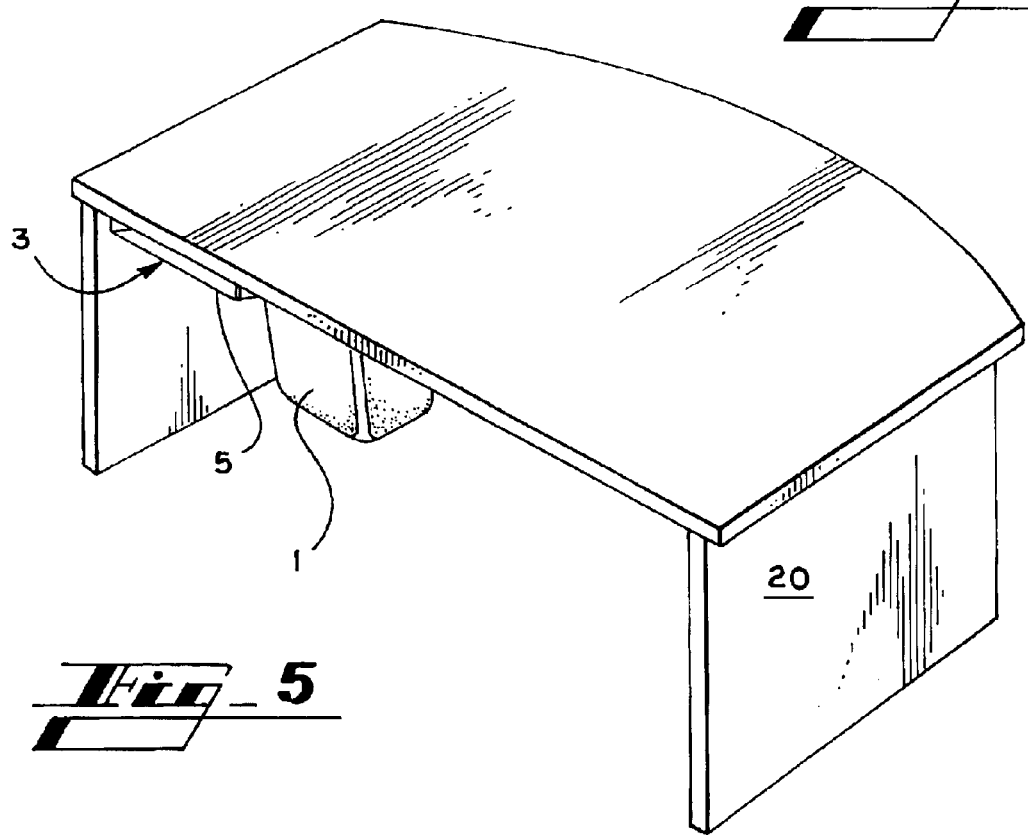
Fig_5

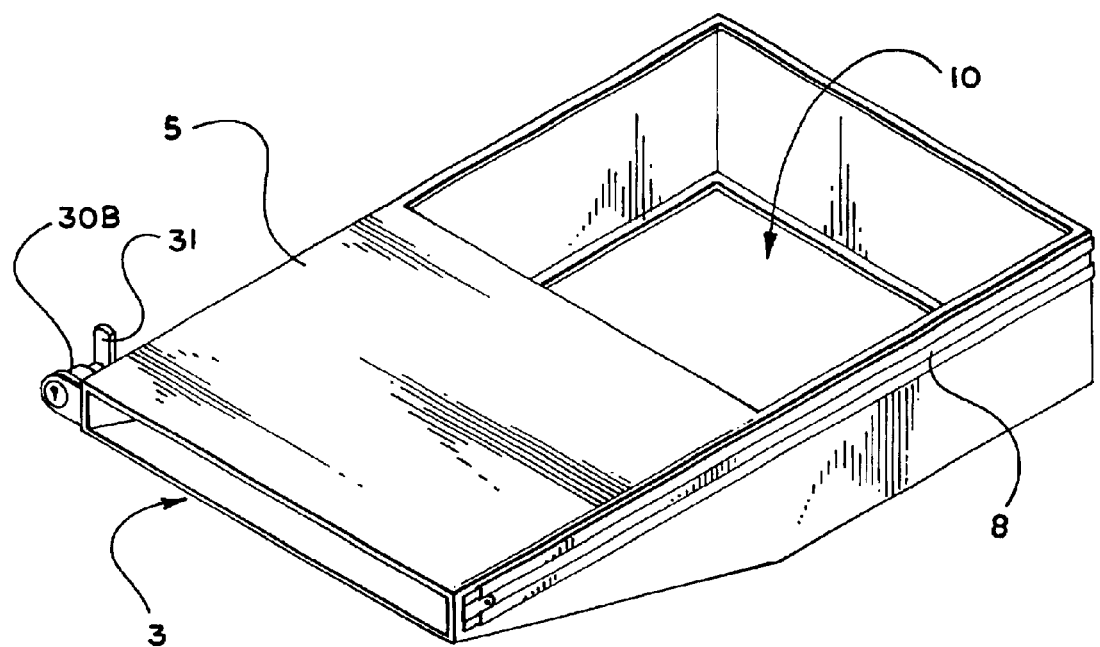
Fig_6
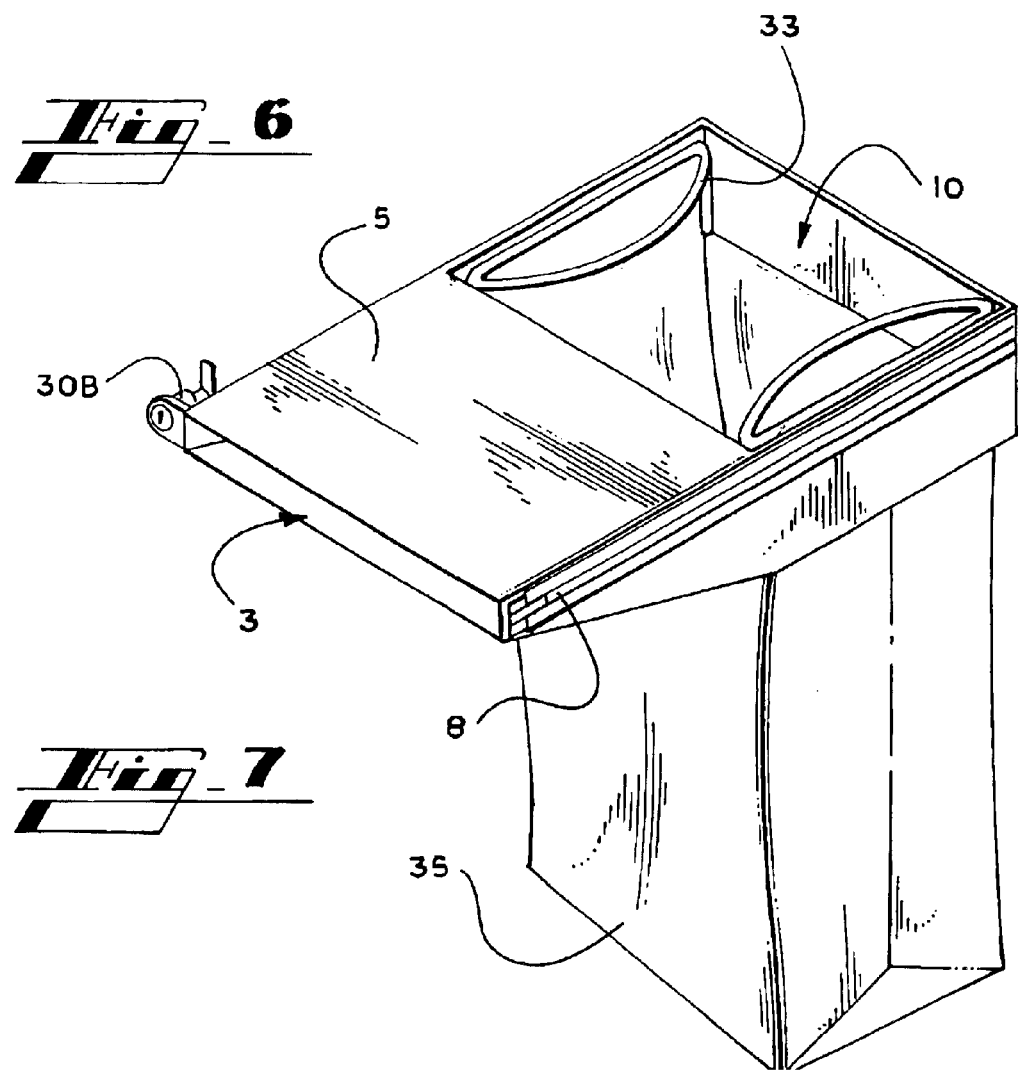
Fig_7

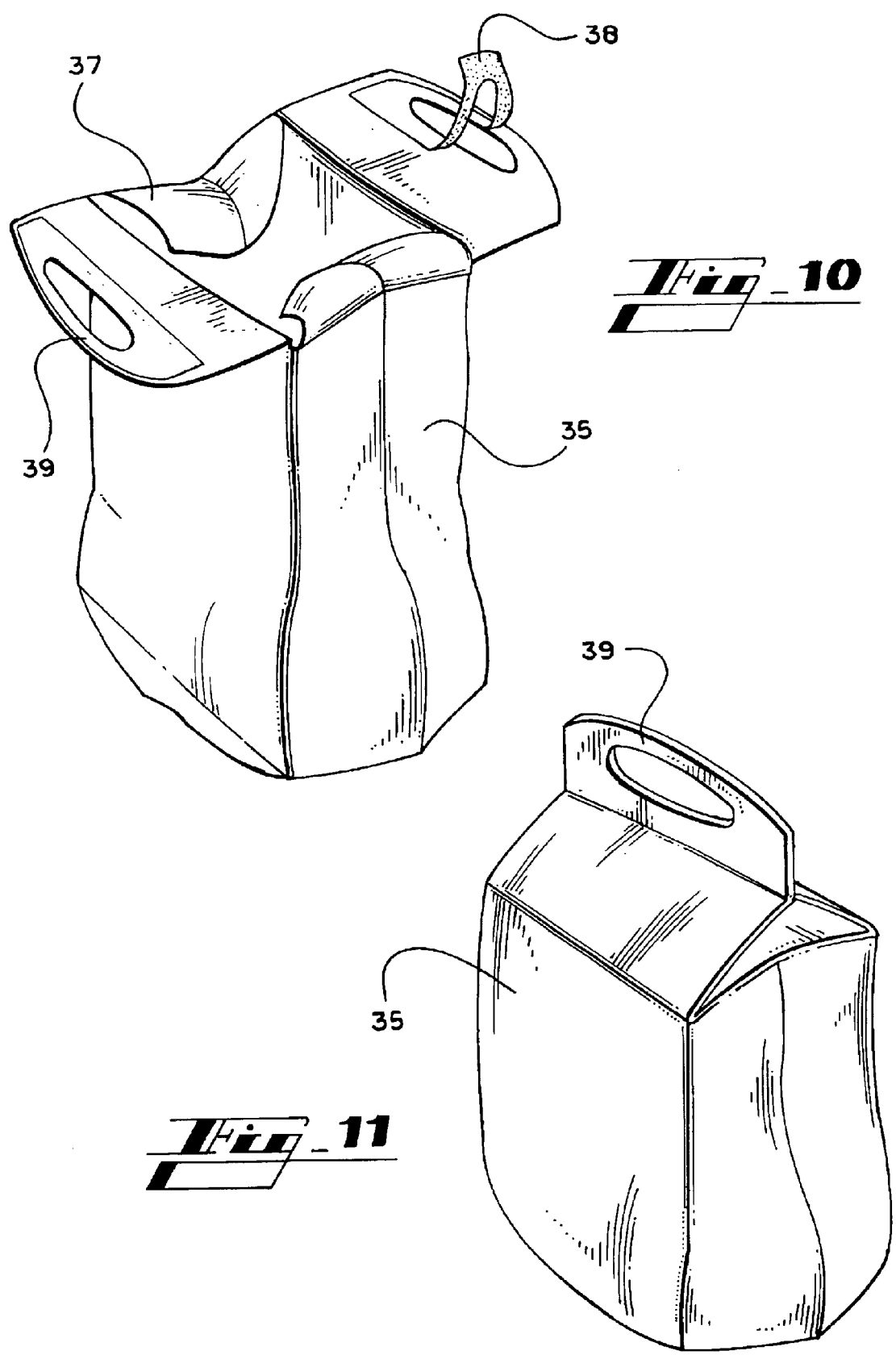

WASTE DISPOSAL APPARATUS

CROSS-REFERENCE TO RELATED APPLICATIONS

The present application claims priority to U.S. Provisional Application Ser. No. 60/390,686, filed Jun. 18, 2002, which is relied on and herein incorporated by reference.

BACKGROUND

The present invention relates to the disposal of sensitive documents in secure containers for use in integrated office furniture, including cubicles, desks, private offices, common-area receptacles and the like.

Presently, most disposal containers in an office environment are large, and located in a file room or photocopy room to accommodate the large containers. In instances where such containers are provided for the disposal of secure documents, most individuals do not know what such containers are used for, or will not undertake the inconvenience to go to the container location to dispose of the sensitive waste. Further, the waste deposited in these containers is typically not recycled and adds to environmental pollution.

Where individual waste receptacles are provided at individual office user stations, desks, and cubicles, such receptacles typically include wastebaskets inconveniently placed in the office space. These individual receptacles are not aesthetically pleasing to office personnel or visitors, and are unsecured. These individual receptacles also obstruct cleaning crews, who must move the wastebaskets to vacuum and clean the office space.

To answer these and other problems, the present invention provides an access-controlled apparatus for disposing of sensitive waste material at individual work stations in an environmentally-friendly manner that takes up less space in the office and improves user convenience and office aesthetics by integrating into existing office furniture.

SUMMARY OF THE INVENTION

The present invention provides a secure waste disposal apparatus comprising a drop chute and a removable disposal container integrated into office furniture for receiving sensitive waste material.

In an embodiment of the present invention, a container and chute system that includes glides and a lock adaptable to desks, cabinets, shelves and other office furniture is provided. It is thus an object of the present invention to permit existing office furniture to be retrofitted with the present invention.

In another embodiment of the present invention a bag, collar, and chute system that includes glides and a lock adaptable to desks, cabinets and other office furniture is provided for receiving sensitive waste material.

It is another object of the present invention to provide a locking mechanism so that the sensitive material waste may be collected only by authorized personnel.

BRIEF DESCRIPTION OF THE DRAWINGS

FIG. 4 is a top perspective view of an embodiment of the present invention integrated into an office desk.

FIG. 5 is a top perspective view of an embodiment of the present invention integrated into an office desk.

FIG. 6 is a top perspective view of a drop chute in an embodiment of the present invention.

FIG. 7 is a top perspective view of an embodiment of the present invention including a drop chute and disposal bag.

FIG. 10 is a top perspective view of an open disposal bag in an embodiment of the present invention.

FIG. 11 is a top perspective view of a sealed disposal bag in an embodiment of the present invention.

DETAILED DESCRIPTION OF THE INVENTION

In current office environments, individuals must dispose of sensitive documents in a laminate container, dumpster or shredder, typically located in a copy area or other designated common area of an office. Because of the inconvenient location from employees' personal work areas, employees often under-utilize the disposal containers. Sensitive materials thus have a greater risk of exposure to unauthorized personnel. Through an integrated furniture design, the present invention provides a more convenient and efficient disposal apparatus for collecting waste material in a secure and environmentally-friendly manner.

Figure 1:
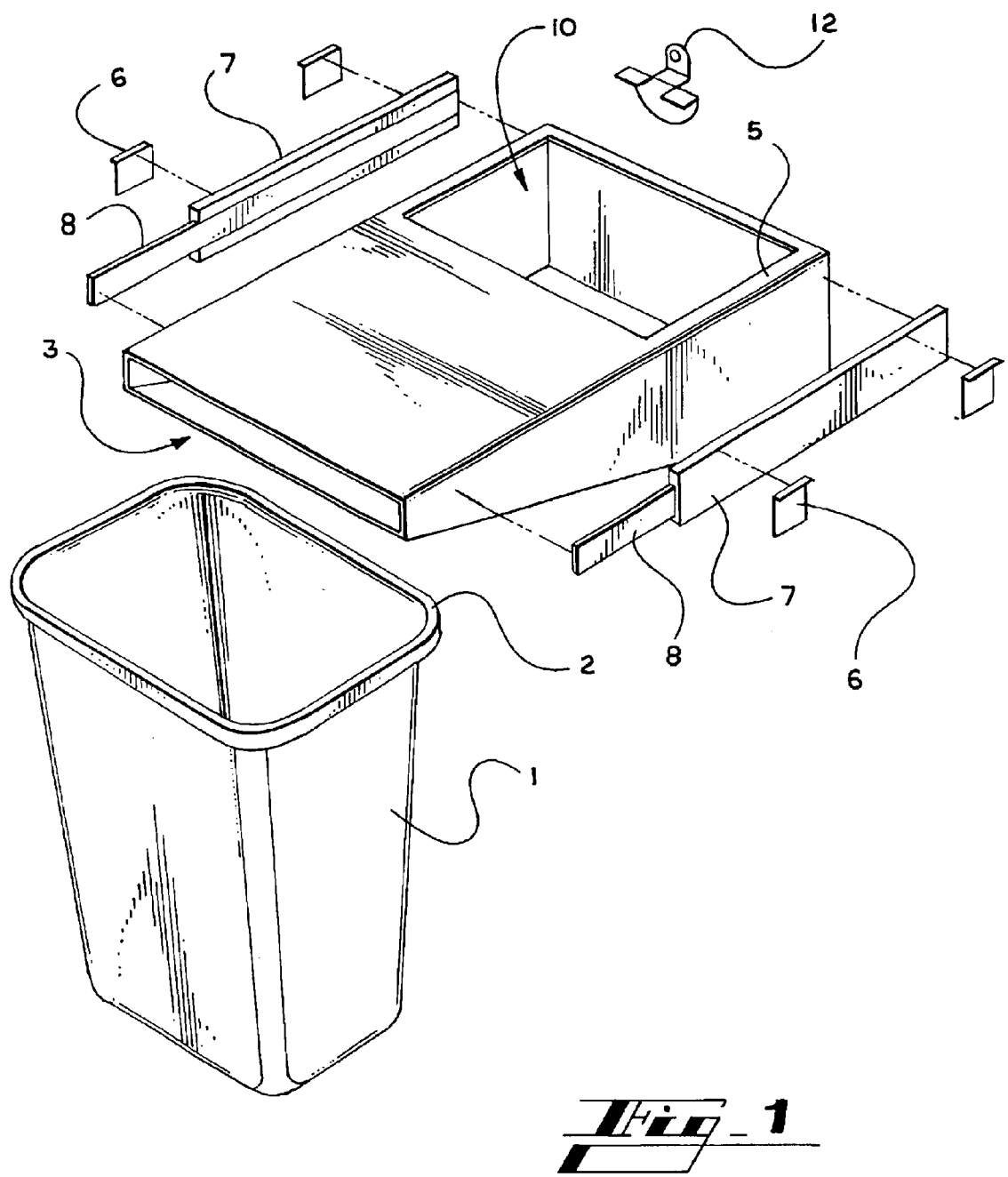
FIG. 1 is a top exploded view of an embodiment of the present invention.

Referring to FIG. 1, a waste container 1 is provided for collecting waste material. The waste container 1 may include wastebaskets, plastic and metal containers, bags, mesh containers, and like receptacles for recovering waste materials. In an embodiment of the invention, waste container 1 includes a surrounding lip 2 at the opening of the container 1.

Figure 2:
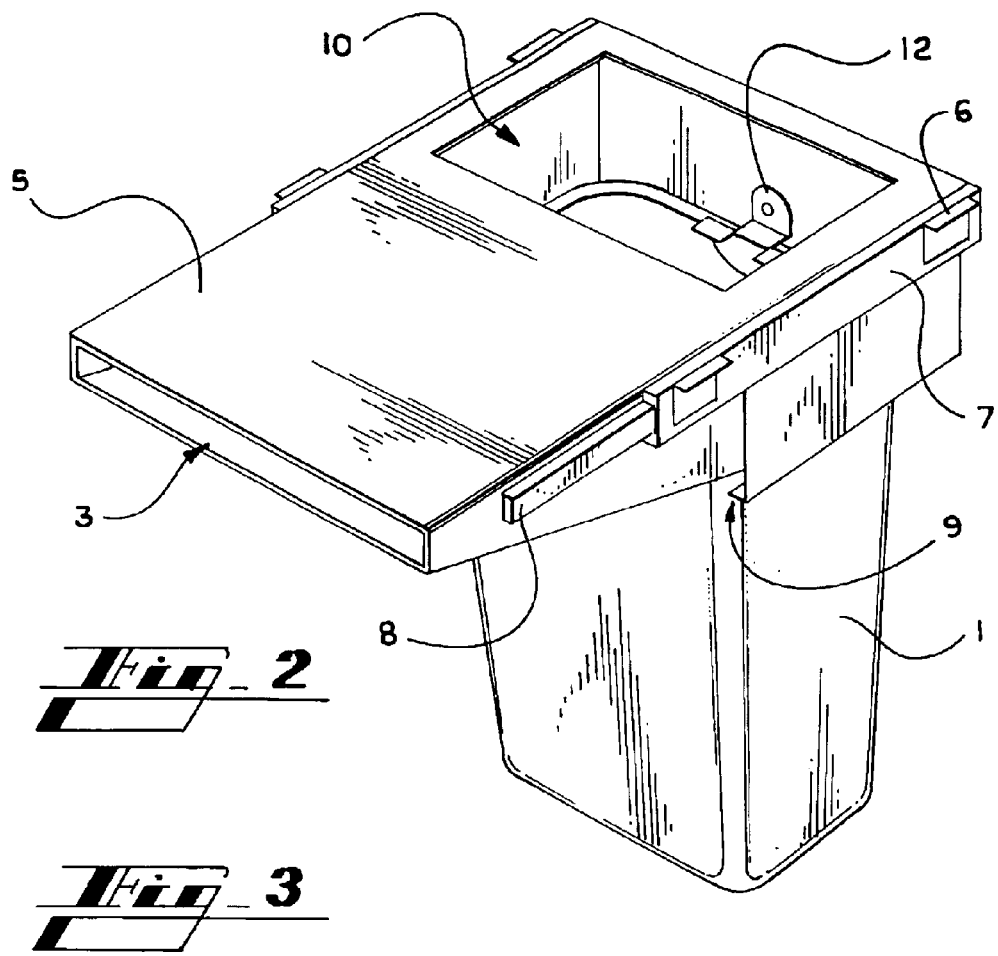
FIG. 2 is a top perspective view of an embodiment of the present invention.
Figure 3:
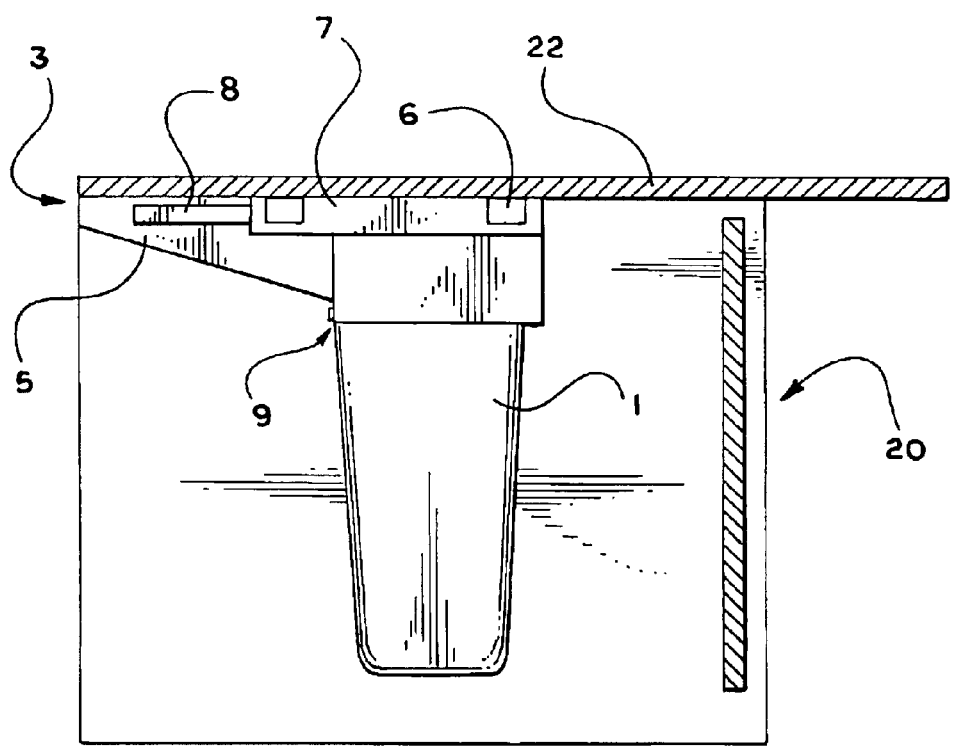
FIG. 3 is a side-sectional view of an embodiment of the present invention integrated in an office desk.

With continuing reference to FIG. 1, and referring to FIGS. 2–4, a drop chute 5 is provided for holding waste container 1 to collect waste material deposited in drop chute 5.

Referring to FIG. 4, in an embodiment of the invention, lip 2 of waste container 1 slides onto holder rails 9 of drop chute 5. A holder rail 9 is preferably provided on each of the left and right side of the drop chute 5 to hold the left and right sides of the lip 2 of waste container 1.

Referring to FIGS. 1 and 2, in an embodiment of the invention, drop chute 5 includes a container locking latch 12 to help hold container 1 in place in the drop chute 5. The rotatable locking latch 12 is preferably affixed to the rear inside face of drop chute 5 to permit the latch 12 to swing upward to allow container 1 to be slid in place on rails 9. After container 1 is slid into the drop chute 5 against the rear inside surface, latch 12 is turned downward to secure container 1 in drop chute 5 as shown in FIG. 2.

Referring to FIGS. 1–5, drop chute 5 includes drop slot 3 for depositing waste material. In an embodiment of the invention, the drop chute 5 includes an incline sloping from drop slot 3 to the opening of waste container 1 to facilitate depositing the waste material into the waste container 1. In embodiments of the invention, drop slot 3 is 1¾ inches wide to accommodate documents, folders, and binders (typically 1½ inches wide) for disposal. Those of ordinary skill in the art will appreciate that drop chute 5 and drop slot 3 may be constructed to such dimensions as may be necessary for collecting any desired materials to be deposited in the apparatus.

Referring to FIG. 2, in an embodiment of the invention, drop chute 5 includes accessibility opening 10 for authorized personnel to lock or unlock latch 12 for installing or removing container 1. Further, opening 10 allows authorized personnel to dislodge any deposited materials that may not properly enter container 1.

With continuing reference to FIGS. 1 and 2, and referring to FIG. 3, in embodiments of the present invention, the disposal chute 5 includes left and right glides 8. Left and right glide rails 7 attach with brackets 6 to office furniture, such as desks 20. Glide rails 7 are connected by preferably four brackets 6 to the underside of the top of desk 20. Glides 8 are affixed to drop chute 5, and glides 8 are extendably secured within glide rails 7 to permit drop chute 5 to be extended inward and outward from beneath desk 20. It will be appreciated that glides 8 and glide rail 7 may include any glide systems well-known in cabinetry, file systems, and the like. It will further be appreciated that glides 8 may include one or more stoppers to prevent drop chute 5 from being extended too far forward out of glide rails 7. Alternatively, glide rails 7 may include one or more stoppers to prevent glides 8 (and drop chute 5) from extending out of the slide rails 7.

Referring to FIGS. 3 and 4, in one embodiment of the invention, drop chute 5 and installed container 1 are positioned between top-surface 22 of desk 20 just above the floor, and far enough toward the back inside surface of desk 20 so that drop slot 3 is conveniently located near a user at the desk 20 without the drop chute 5 and waste container 1 interfering with the knee and foot clearance of an individual when seated at desk 20. Further, drop chute 5 and container 1 when positioned beneath desk 20 discourage unauthorized users from attempting to access waste material deposited in container 1.

Referring to FIGS. 4 and 6, a lock 30 is preferably provided for controlling access to container 1. In the depicted embodiments, lock 30 includes a lock and key locking mechanism; however, it will be appreciated that padlocks, electronic locks, code panels, and similar access control mechanisms may be used in the present invention.

Referring to FIG. 4, in one embodiment of the present invention, lock 30A is secured to glide rails 7 so that a key turns a locking bar to block at least one glide 8 from being able to slide forward from under the desk 20. When lock 30A is unlocked with a key the glide block is removed to permit glides 8 and drop chute 5 to slide forward for accessing waste container 1.

In an alternative embodiment, as shown in FIG. 6, lock 30B may be attached to glide rail 8 such that a key locking lock 30B causes glide bar 31 to lock behind a portion of a locking receiver connected to glide rail 7 (see FIG. 2), a roller, or a lock receiver connected directly to desk 20. It will be appreciated from FIG. 6, with reference to FIG. 2, that the structure and function of glide 8 and glide rail 7 may be reversed so that glide 7 may include a bracketed bar onto which glide 8 extendably surrounds (as in FIG. 6) or glide rail 7 may be bracketed to provide a surrounding piece into which glide 8 extendably inserts (FIG. 2).

Figure 8:
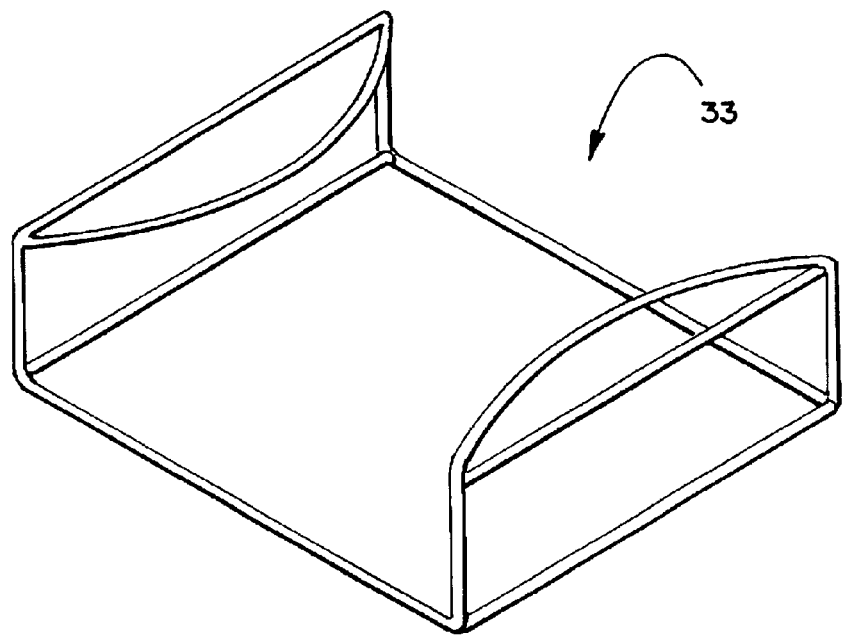
FIG. 8 is a top perspective view of a bag collar in an embodiment of the present invention.

Referring to FIG. 7, in an alternative embodiment of the invention, the waste container 1 may include a bag 35 and collar 33 (FIG. 8).

Referring to FIG. 8, bag collar 33 is inserted into opening 10 of drop chute 5 such that the bag collar 33 rests on an inner rim (not shown) within opening 10 of chute 5.

Figure 9:
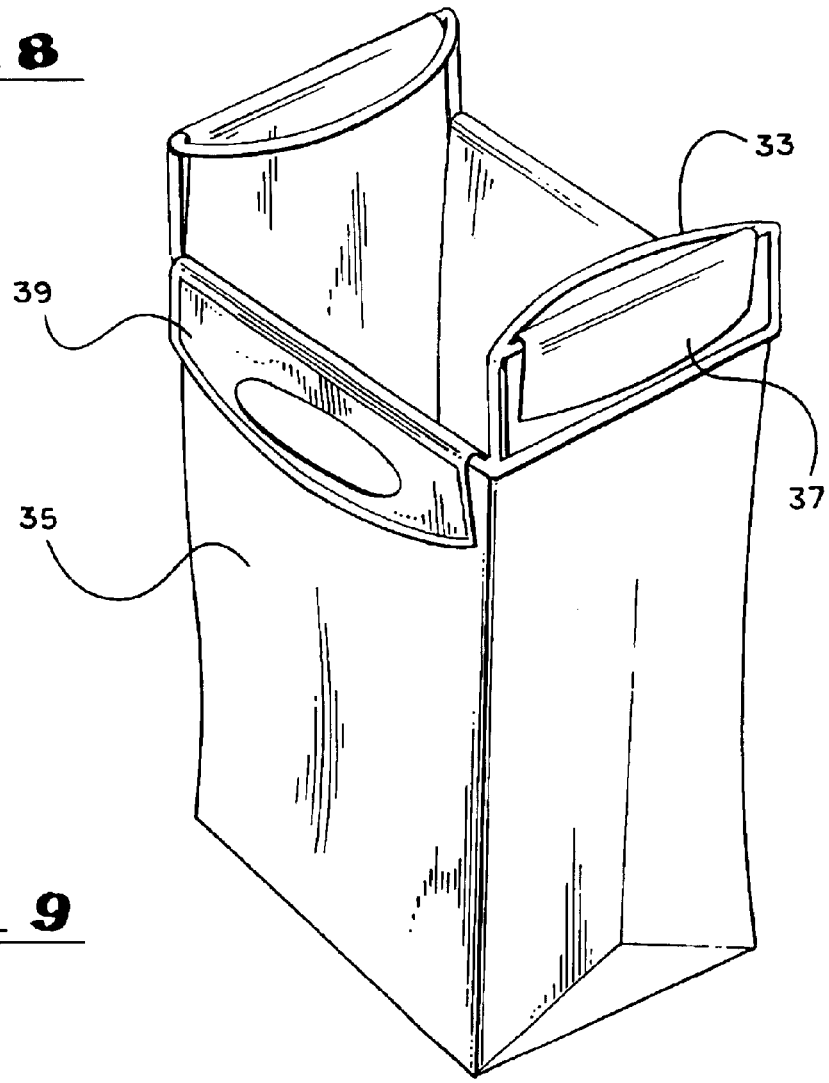
FIG. 9 is a top perspective view of a bag and bag collar in an embodiment of the present invention.

Referring to FIGS. 9–11, disposal bag 35 includes a right and left pair of bag flaps 37 and front and back pair of bag flaps 39 for engaging bag collar 33 to hold the bag in place for receiving discarded waste as shown in FIGS. 7 and 9. In an embodiment of the invention, flaps 39 are sealable so that an authorized personnel unlocking the waste container system, and retrieving disposal bag 35, can remove peels 38, fold flaps 37 into the bag, and seal flaps 39 together as shown in FIGS. 10 and 11.

It will be appreciated that drop slot 3 should be small enough to prevent unauthorized access to dropped material. Alternatively, drop slot 3 may be designed as in a standard mailbox dropping mechanism to permit deposit of sensitive waste, while preventing unauthorized access to the dropped material. In alternative embodiments, drop slot 3 may be positioned a distance above and/or away from disposal container 1 or disposal bag 35 so that an individual may not reach deposited disposal material through the drop slot 3.

In embodiments of the present invention only authorized personnel, such as a designated office person or a collection and recycling service are provided access to lock 30.

Referring again to FIGS. 2 and 3, it will be appreciated that authorized personnel removing waste material unlock lock 30 (FIG. 4), pull the drop chute 5 forward from the office furniture, turn latch 12 to permit container 1 to be pulled forward and emptied, replace container 1 onto rail holders 9 and turn latch 12 back to securely hold container 1, and slide drop chute 5 and container 1 forward back beneath the office furniture to lock drop chute 5 in place. Similarly, when a bag 35 and bag collar 33 are used (FIGS. 6–9), drop chute 5 is slid forward, the bag 35 removed from opening 10, a new bag 35 is placed on bag collar 33, and the drop chute 5 is returned and locked into place.

In a preferred embodiment of the present invention, collected waste, including metal staples, clips, paper, and the like, is all recycled to provide an environmentally-friendly solution for disposing of the waste materials.

It will further be appreciated that the present invention does not require a lock 30, and may be used as a general waste collection apparatus within an office environment to provide a more efficient and aesthetic means of collecting waste. In addition, it will be appreciated that the present invention is not limited to integration into existing furniture, but may include a stand-alone housing or customized cabinet for use as an independent apparatus.

Accordingly, while the invention has been described with reference to the structures and processes disclosed, it is not intended to be confined to the details set forth, but is intended to cover such modifications or changes as may fall within the scope of the following claims.

What is claimed is:

1. A waste disposal apparatus comprising:
   a. a waste container;
   b. a drop chute for directing waste to the waste container, wherein the drop chute includes a connector for retractably securing the drop chute beneath a top surface portion of a piece of furniture, with the waste container inaccessible through the top surface portion; and
   c. a latch for removably engaging the waste container in the drop chute.

2. The waste disposal apparatus of claim 1 wherein the piece of furniture is selected from the group consisting of a shelf, cabinet, dresser, table, and desk.

3. The waste disposal apparatus of claim 2 wherein the piece of furniture is a desk.

4. The waste disposal apparatus of claim 3 wherein the drop chute retracts to position the waste container under the top surface of the desk to afford knee and foot clearance to an individual seated at the desk.

5. The waste disposal apparatus of claim 1 further comprising a lock for controlling access to the waste container.

6. The waste disposal apparatus of claim 1 wherein the connector comprises one or more sliding glides for retractably securing the drop chute beneath the top surface portion.

7. The waste disposal apparatus of claim 6 further comprising a lock for controlling access to the waste container.

8. The waste disposal apparatus of claim 7 wherein the piece of furniture is selected from the group consisting of a shelf, cabinet, dresser, table, and desk.

9. The waste disposal apparatus of claim 8 wherein the piece of furniture is a desk.

10. A waste disposal apparatus comprising:
   a. a drop chute including a connector for movably securing then drop chute beneath a solid surface; and
   b. a waste container for receiving waste materials underneath the solid surface from a drop slot in the drop chute, wherein the drop chute slants downward from the drop slot to the waste container.

11. The waste disposal apparatus of claim 10 wherein a latch removably engages the waste container in the drop chute.

12. The waste disposal apparatus of claim 11 wherein the waste container includes a lip supported on one or more holding rails of the drop chute.

13. The waste disposal apparatus of claim 12 further comprising a lock for restricting access to the waste container.

14. The waste disposal apparatus of claim 12 wherein the drop chute includes a rotatable latch for securing the waste container in the drop chute.

15. The waste disposal apparatus of claim 10 further comprising a lock for restricting access to the waste container.

16. The waste disposal apparatus of claim 15 wherein the drop chute includes a rotatable latch for securing the waste container in the drop chute.

17. The waste disposal apparatus of claim 10 wherein the drop chute includes a rotatable latch for securing the waste container in the drop chute.

18. The waste disposal apparatus of claim 10 wherein the waste container is a waste bag.

19. The waste disposal apparatus of claim 18 wherein the drop chute includes a bag collar supporting the waste bag.

20. The waste disposal apparatus of claim 10 wherein the connector includes one or more sliding glides.

21. A waste disposal apparatus comprising:
   a. a waste container;
   b. a retractable drop chute for delivering waste to the container below a continuous solid portion of a top surface of a piece of furniture entirely covering the waste container;
   c. a connector for movably securing the drop chute beneath the top surface of the piece of furniture; and
   d. a drop slot opening in the drop chute that aligns adjacent to the top surface of the piece of furniture.

22. The waste disposal apparatus of claim 21 further comprising a lock for controlling access to the waste container.

23. The waste disposal apparatus of claim 22 wherein the piece of furniture is a desk.

24. The waste disposal apparatus of claim 21 wherein the piece of furniture is a desk.

25. The waste disposal apparatus of claim 21 wherein the drop chute includes a latch removably securing the waste container.

26. The waste disposal apparatus of claim 25 wherein the latch is rotatable.

27. The waste disposal apparatus of claim 21 wherein the waste container is a waste bag.

28. The waste disposal apparatus of claim 27 wherein the drop chute includes a bag collar supporting the waste bag.

29. The waste disposal apparatus of claim 21 wherein the connector includes one or more sliding glides.

30. A waste disposal apparatus comprising:
   a. a drop chute including a removable waste container;
   b. a connector for retractably attaching the drop chute beneath a surface for covering the container; and
   c. an aperture in the drop chute that retracts adjacent to the surface when the drop chute is fully retracted beneath the surface, wherein the drop chute slants downward from the aperture to the waste container.

31. The waste disposal apparatus of claim 30 further comprising a lock to control access to the waste container beneath the surface.

32. The waste disposal apparatus of claim 31 wherein the surface is a desktop surface.

33. The waste disposal apparatus of claim 30 wherein the surface is a desktop surface.

34. The waste disposal apparatus of claim 30 wherein the connector includes one or more sliding glides.

* * * * *